United States Patent
Fowler et al.

(10) Patent No.: US 8,665,454 B2
(45) Date of Patent: Mar. 4, 2014

(54) LASER RANGEFINDER SENSOR

(75) Inventors: Keith Fowler, Newport, TN (US); Nan-Ming Lai, Weehawken, NJ (US)

(73) Assignee: OSI Optoelectronics, Inc., Hawthorne, CA (US)

( * ) Notice: Subject to any disclaimer, the term of this patent is extended or adjusted under 35 U.S.C. 154(b) by 0 days.

(21) Appl. No.: 13/613,035

(22) Filed: Sep. 13, 2012

(65) Prior Publication Data

US 2013/0242314 A1 Sep. 19, 2013

Related U.S. Application Data

(60) Provisional application No. 61/534,148, filed on Sep. 13, 2011.

(51) Int. Cl.
*G01B 11/24* (2006.01)

(52) U.S. Cl.
USPC .......................................... 356/601; 356/608

(58) Field of Classification Search
USPC .................................................. 356/601, 608
See application file for complete search history.

(56) References Cited

U.S. PATENT DOCUMENTS

| | | | | |
|---|---|---|---|---|
| 4,627,734 A * | 12/1986 | Rioux | ............................ | 356/607 |
| 5,353,073 A * | 10/1994 | Kobayashi | ..................... | 351/221 |
| 5,896,190 A * | 4/1999 | Wangler et al. | ............... | 356/4.01 |
| 6,304,321 B1 * | 10/2001 | Wangler et al. | ............... | 356/4.01 |
| 8,116,558 B2 * | 2/2012 | Hayashi et al. | ................ | 382/154 |
| 8,121,399 B2 * | 2/2012 | Hayashi et al. | ................ | 382/154 |
| 8,300,048 B2 * | 10/2012 | Hayashi et al. | ................ | 345/424 |
| 2002/0140924 A1 * | 10/2002 | Wangler et al. | .................. | 356/28 |
| 2009/0167761 A1 * | 7/2009 | Hayashi et al. | ................ | 345/424 |
| 2009/0184961 A1 * | 7/2009 | Hayashi et al. | ................ | 345/424 |
| 2009/0202155 A1 * | 8/2009 | Hayashi et al. | ................ | 382/203 |

* cited by examiner

*Primary Examiner* — Roy M Punnoose
(74) *Attorney, Agent, or Firm* — Novel IP

(57) ABSTRACT

The specification discloses a pulsed time-of-flight laser range finding system used to obtain vehicle classification information. The sensor determines a distance range to portions of a vehicle traveling within a sensing zone of the sensor. A scanning mechanism made of a four facet cube, having reflective surfaces, is used to collimate and direct the laser toward traveling vehicles. A processing system processes the respective distance range data and angle range data for determining the three-dimensional shape of the vehicle.

19 Claims, 6 Drawing Sheets

| Parameter | Specification |
|---|---|
| Scan Rate | 120 Hz |
| Angular Resolution | 1 Degree |
| Minimum Range | 2 Feet (0.6 m) |
| Maximum Range | 35 Feet (10.7 m) |
| Width Coverage | 46 ft at 23 ft Mounting Height (14 m at 7 m Mounting Height) |
| Range Accuracy | ± 1 Inches (±2.5 cm) |

FIG. 5A

| Parameter | Specification |
|---|---|
| Wavelength | 904 nm |
| Pulse Width (Max) | 8 ns |
| Energy Per Pulse (Max) | 64 nJ |
| Laser Power (Average) | 8 µW |

FIG. 5B

| Parameter | Specification |
|---|---|
| Temperature | -40 to +70 Degrees C (with Sun Loading) |
| Thermal Shock | 15 Degrees C Per Minute |
| Humidity | 0 to 100% Condensing |
| Rain | 0.8 Inches/Hour (20 mm/Hour) Operating<br>4 Inches/Hour (100 mm/Hour) Maximum |
| Snow Loading | 20 lb./ft$^2$ (98 Kg/m$^2$) |
| Ice Loading | Accumulation to 0.6 Inches (15 mm) |
| Wind Loading | 43 Knots Steady, 73 Knots Gusts |
| Dust | 1g/m$^3$ with Particles 10-100 Micrometer Diameter |
| Vibration | 5 to 30 Hz, 0.5 G for 3 Minutes in Each Axis |
| Shock | 10 G in Each Axis |
| Reliability | >50,000 Hours (Mean Time Between Failures) |
| Maintainability | 15 Minutes (Mean Time to Replace) |
| IP Rating | IP66 (IP4X Per IEC60950-22 2005 Version) |

FIG. 5C

LASER RANGEFINDER SENSOR

CROSS-REFERENCE

The present specification relies on U.S. Provisional Patent Application No. 61/534,148, filed on Sep. 13, 2011 and entitled "Improved Laser Rangefinder Sensor". The aforementioned specification is incorporated by reference in its entirety herein.

FIELD

The present specification relates generally to object sensors, and in particular to improved laser rangefinder sensors useful in accurately and precisely sensing, detecting and/or classifying vehicles while also enabling the triggering of traffic, import, export, or other regulatory enforcement cameras.

BACKGROUND

A conventional optoelectronic sensor uses a time-of-flight laser rangefinder system to measure the normal distance to a road surface from a fixed point above the road surface and then measure the distance to a vehicle which either passes or stops under the sensor. Because of the high repetition rate of the pulsed beam, traditional systems are able to develop a longitudinal profile of the vehicle using multiple consecutive range measurements as the vehicle moves under the sensor. Some conventional systems may also be able to determine vehicle speed and use this information to develop a profile of the vehicle.

Conventionally, the sensor receives a portion of the energy reflected from either the area or an object located within the area, such as a vehicle. The returned pulse energy is then provided as an input to a receiver for determining a time of flight change for pulses emitted and received, which may be caused by the presence of an object within the area. The sensor is also provided with various features useful in providing outputs which indicate the speed, census, size or shape of one or more objects in the area. For example, a typical sensor is provided with a component for receiving an input from the time of flight determining means and for providing an output indicating whether the object meets one of a plurality of classification criteria (e.g., is the object an automobile, truck or motorcycle).

Such sensors are being used as noninvasive solutions to track and analyze traffic across a wide range of applications, including toll collection, traffic flow analysis, bridge/tunnel clearance verification, as well as traffic control and surveillance. These applications have highly dynamic operating environments that demand very precise sensor tracking and detection capabilities. Conventional systems are still unable to accurately measure and track high speed traffic flow through a location with sufficiently high scan rates to enable vehicle identification and classification, particularly during inclement weather.

Accordingly, there is need for a sensor system with improved range accuracy and resolution at high scan rates. There is also a need for a sensor system that reduces false measurements arising due to adverse weather conditions.

SUMMARY

The present specification discloses a pulsed time-of flight ranging sensor comprising laser means for providing vehicle classification information. More specifically, the present specification discloses a pulsed time-of-flight ranging sensor comprising laser means for determining a distance range from the sensor to portions of a vehicle whereby the vehicle travels within a sensing zone of the sensor. The present specification also discloses respective range data outputs corresponding with a sensor angle for each distance range data output. In addition, scanning means for scanning at least one beam across the vehicle is provided, which in one embodiment is a four facet cube, having reflective surfaces, that is used as a scanning mirror. Further, processing means is also provided for processing the respective distance range data and angle range data for determining the three-dimensional shape of the vehicle.

In one embodiment, the present specification is a system for determining the three-dimensional shape of a vehicle, the system comprising: a distance sensor comprising a laser transmitter and a photodetector, for generating a plurality of laser beams and for detecting a plurality of reflected beams, each of said reflected beams corresponding to one of the plurality of generated laser beams; a scanning mechanism, positioned relative to the distance sensor, for collimating each of said generated laser beams across the vehicle, wherein said scanning mechanism comprises a four facet cube, each having a reflective surface, wherein said four facet cube is positioned relative to the distance sensor such that it is adapted to reflect the generated laser beams, and wherein said scanning mechanism further comprises a scanner control circuit in data communication with said distance sensor to trigger the generation of the laser beams to create predefined scan angles; and a processing system to determine distance ranges from the sensor to portions of the vehicle using time-of-flight measurements derived from timings of said generated laser beams and reflected beams, when the vehicle travels within a sensing zone of the sensor and to determine a three-dimensional shape of the vehicle based on distance ranges.

Further, the system of the present specification comprises a time-to-digital converter (TDC) for time-of-flight measurements, wherein the TDC is adapted to receive up to four return pulses from a single laser pulse. In one embodiment, the system comprises at least two TDCs.

In one embodiment, the four facet cube described in the present specification rotates continuously in one direction at a constant speed and enables four scans for each revolution.

In one embodiment, the system generates a plurality of laser footprints and wherein said laser footprints appear as stripes that touch end to end and provide a continuous line of detection.

In one embodiment, the present specification discloses a method for determining a three-dimensional shape of a vehicle passing through a sensing zone of a ranging sensor comprising a laser transmitter and a photodetector, the method comprising: scanning a plurality of laser beams across the vehicle using a scanning mechanism comprising a four facet cube, said four facet cube having reflective surfaces that are used to direct the laser beams across its field of view in a straight line, said scanning mechanism further comprising a scanner control circuit that triggers the laser at predefined scan angles; determining a distance range from the sensor to portions of the vehicle using time-of-flight measurements; and processing the distance range data for each scan angle to determine the three-dimensional shape of the vehicle.

In one embodiment, the four facet cube rotates continuously in one direction at a constant speed during scan. In another embodiment, the scanning cube is adapted to produce four scans for each revolution.

In one embodiment, the method of the present specification further uses a time-to-digital converter (TDC) for time-of-flight measurements, wherein the TDC is adapted to receive up to four return pulses from a single laser pulse. In another embodiment, the system comprises at least two TDCs.

In one embodiment, the system generates a plurality of laser footprints during a scan and wherein each of said laser footprints appear as stripes that touch end to end and provide a continuous line of detection.

In one embodiment, the distance range resolution of the system is ±1 cm. In another embodiment, the limits of distance range measurements are customizable.

In one embodiment, the scanner control circuit triggers a laser pulse once for every degree of scan angle.

The aforementioned and other embodiments of the present specification shall be described in greater depth in the drawings and detailed description provided below.

BRIEF DESCRIPTION OF THE DRAWINGS

These and other features and advantages of the present invention will be further appreciated, as they become better understood by reference to the detailed description when considered in connection with the accompanying drawings:

FIG. 5A is a table showing a plurality of performance parameters for the sensing system in accordance with one embodiment;

FIG. 5B is a table describing a plurality of laser output parameters in accordance with one embodiment of the present invention;

FIG. 5C is a table showing a plurality of environmental factors and associated performance parameters in which the sensor is capable of performing, in accordance with one embodiment of the present invention; and, FIG. 6 illustrates a rotating cube scanner according to one embodiment of the present invention.

DETAILED DESCRIPTION

The present specification discloses a pulsed time-of flight ranging sensor system comprising laser means for providing vehicle classification information. More specifically, the present specification discloses a pulsed time-of-flight ranging sensor system comprising a laser means for determining a distance range from the sensor to portions of a vehicle whereby the vehicle travels within a sensing zone of the sensor and a respective range of data outputs corresponding with a sensor angle for each distance range data output.

In addition, the sensing system comprises a scanning means for scanning at least one beam across the vehicle, which, in one embodiment, is a four facet cube, having reflective surfaces, that is used as a scanning mirror. Further, a processing means is also provided for processing the respective distance range data and angle range data for determining the three-dimensional shape of the vehicle.

The present specification discloses multiple embodiments. The following disclosure is provided in order to enable a person having ordinary skill in the art to practice the inventions. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the presently disclosed inventions are to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Figure 1:
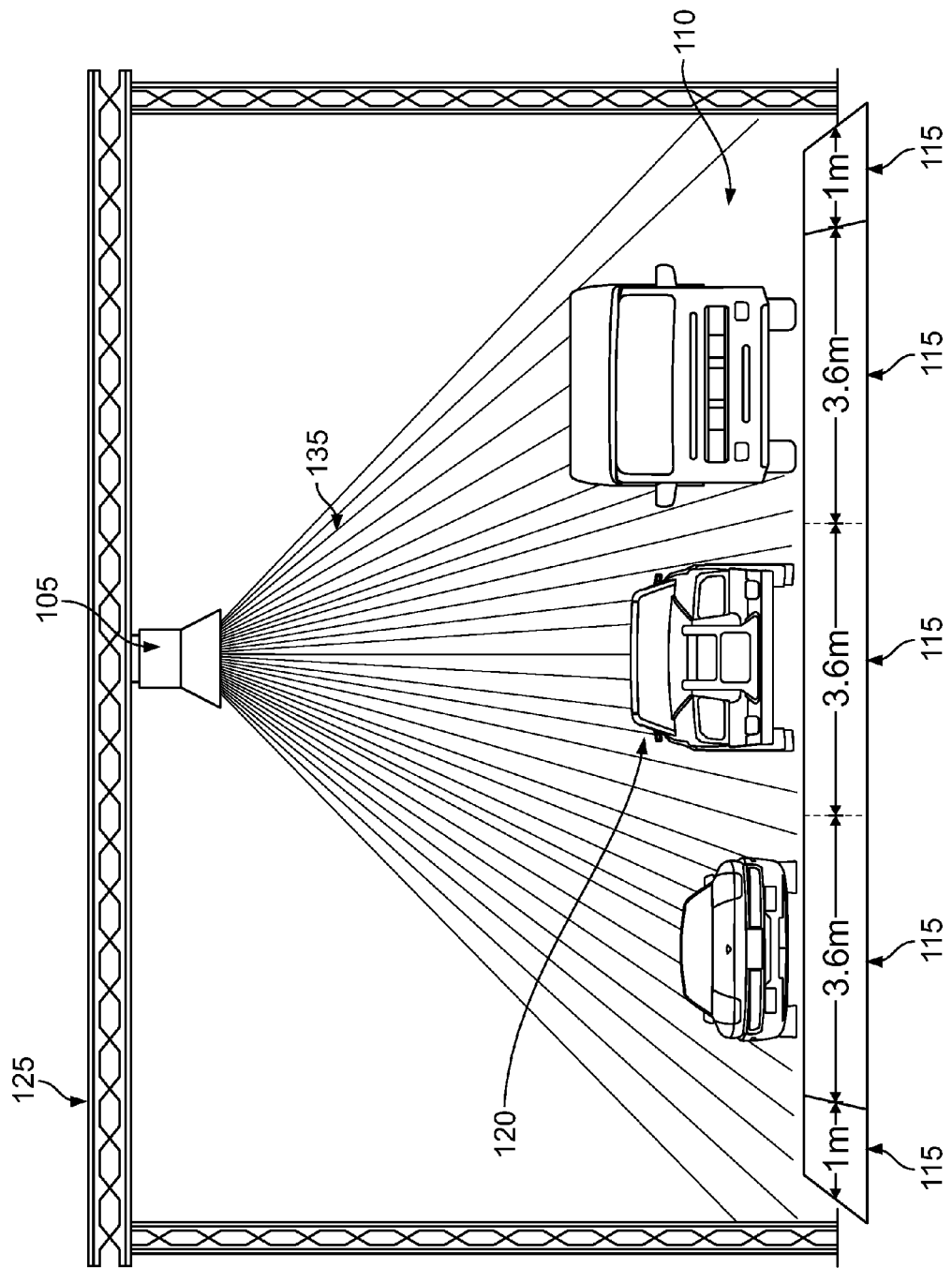
FIG. 1 shows a front-elevation view of one embodiment of an optoelectronic sensor system mounted above a roadway.

FIG. 1 shows a front-elevation view of an optoelectronic sensor 105 of a sensing system that is mounted above a roadway 110, having a plurality of travel lanes 115, for sensing, detecting, and/or classifying vehicles 120 passing below the sensor 105 and also for triggering video and/or audio capturing equipment. In accordance with one embodiment, the sensor 105 is used in multilane electronic toll collection operations for detecting vehicles travelling at expressway speeds. The sensor 105 is typically mounted overhead of travel lanes on either a gantry, pole arm or toll plaza roof structure 125. More specifically, the sensor is preferably mounted in or around the center point of a horizontal portion of the gantry structure 125 which extends over and above the roadway 110 and is kept aloft by being fixedly attached to right and left vertical portions of the gantry structure 125.

Figure 2:
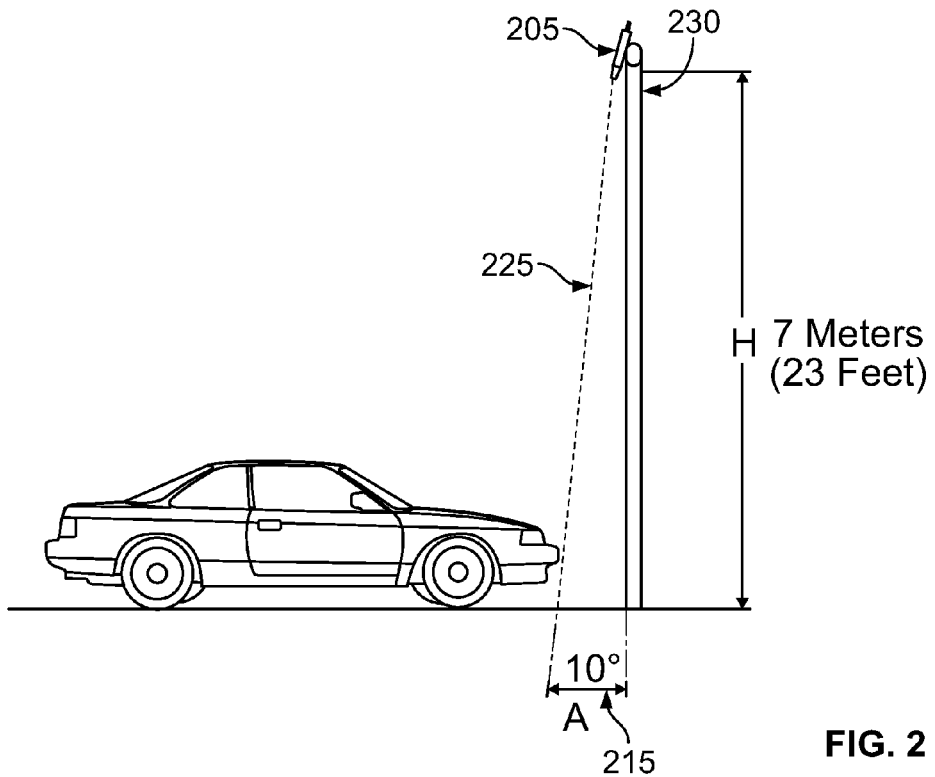
FIG. 2 is a side-elevation view of the sensor, described in FIG. 1A, mounted at a height 'H' and at a forward look down angle 'A'.

FIG. 2 is a side-elevation view of the sensor 205 mounted at a height 'H' of approximately 7 meters (23 ft) and at a forward look down angle 'A' 215 of 10 degrees. The sensor is preferably mounted offset from normal such that a beam 225 emitted from the sensor 205 travels downward toward the roadway and intersects the roadway at an angle that, relative to the gantry 230, is less than 90 degrees. Such an angle can be formed by having the sensor 205 mounted, relative to the gantry 230, using a look down angle 215 in a range of less than 25 degrees and preferably approximately 10 degrees.

Referring to FIGS. 1 and 2, during operation, the sensor 105, scans the roadway, taking distance/range measurements across the width of the road beneath the sensor. When no vehicles are present, the range measurements are equal to the distance range to the road 110. When a vehicle 120 is present beneath the sensor, the distance to the top surface of the vehicle is measured and provides a transverse height profile of the vehicle on each scan. Thus, when a vehicle passes through the scanning laser beam, as shown in FIG. 2, the distances or ranges to various points on the surface of the vehicle are measured by emitting a plurality of laser beams toward the vehicle, detecting a corresponding reflecting beam for each of the plurality of laser beams, recording the time of flight for each emitted and corresponding reflecting beam and using the time of flight data to generate distance information. In one embodiment, sensor 105 scans a narrow laser beam 135 across the width of the 90 degree field of view at a rate of 120 scans per second (sps). The narrow laser beam width enables detection and separation of closely following vehicles traveling at high speed.

These ranges or measured distances are then used in generating a vehicle profile. The profile is formed by using geometric transformations, well known in the art, for the distance measurements obtained. In one embodiment, the laser scan is carried out at various scan angles to obtain a wider range of distance measurements, and to generate a more accurate vehicle profile.

In one embodiment, these measurements are streamed (using wired and/or wireless network) real-time to a computer that is programmed to uniquely detect, classify and determine the position of each vehicle in the roadway. In accordance with an aspect of the present invention, the scanning laser rangefinder measures a single plane profile that enables improved accuracy of vehicle detection and triggering. In one embodiment, pulsed time-of-flight range measurements provide accurate ±2.5 cm (±1.0 in.) vehicle profiles. By streaming consecutive scans to the computer, a full three-dimensional vehicle profile can be developed in real-time.

Figure 4:
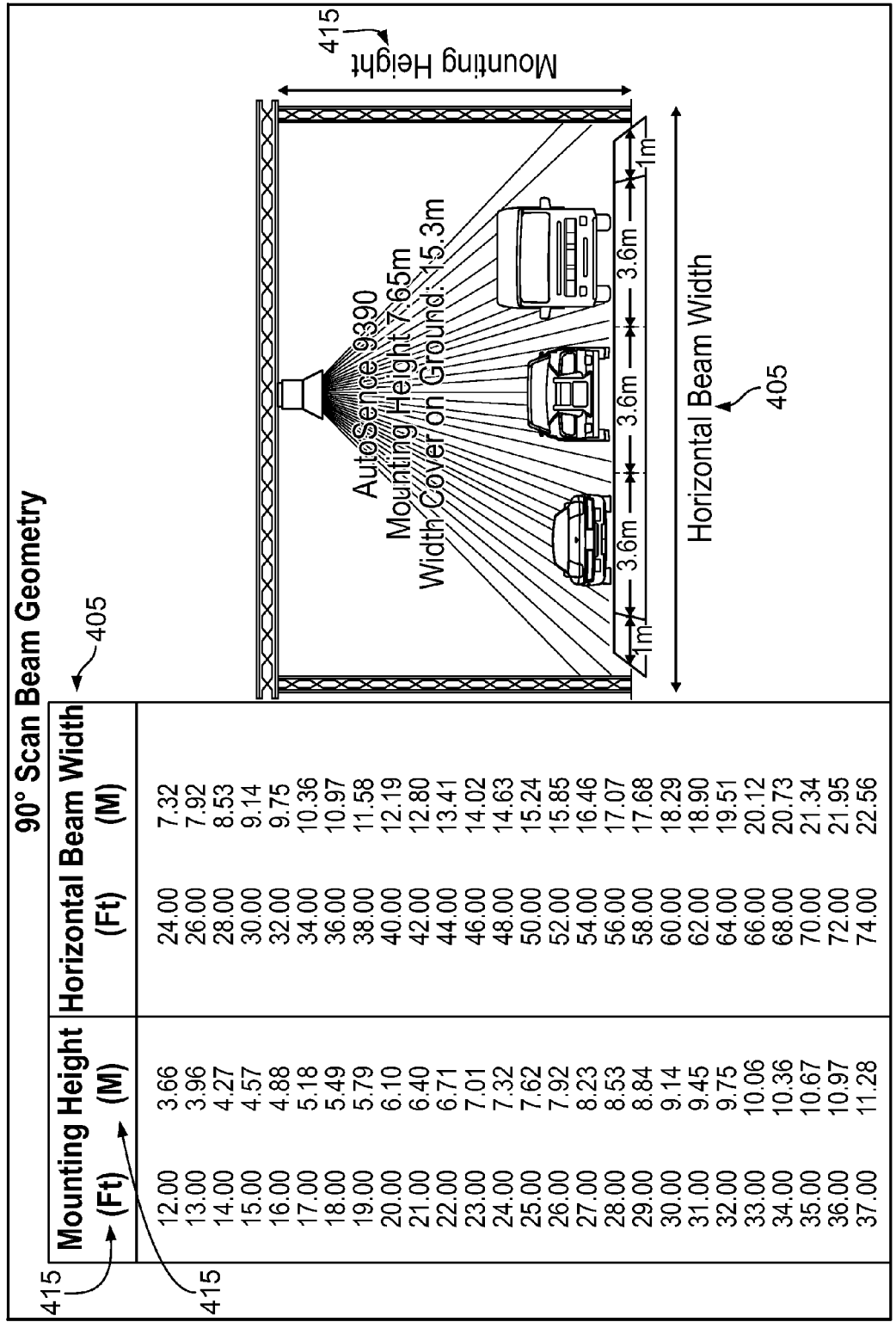
FIG. 4 is a table providing lane coverage data according to varying mount heights for the sensor when the sensor is angled at 0 degrees with respect to the direction of traffic.

It should be noted herein that the sensor mounting height may vary with each installation site. Various horizontal beam width and mounting height correlations are provided below and shown with respect to FIG. 4, which provides a table providing lane coverage, in terms of horizontal beam width 405, with respect to varying mount heights 415 for the sensor when the sensor is angled at 0 degrees into traffic. In a preferred embodiment, the forward look down angle 'A' is in the range of 0 to 10 degrees for creating high reflection of the emitted laser light. A reflective stripe may optionally be painted on the road surface at lengths on the road positioned at a lookdown angle of greater than 10 degrees to increase the reflection of the emitted laser light. A reflective stripe is optionally employed if the pavement is very black and therefore of low reflectivity. This ensures that there is a sufficient amount of energy reflected back in the rain, where water is standing on the pavement and tends to reflect energy away from the scanner (a mirror-like effect).

Referring back to FIGS. 1 and 2, in accordance with an embodiment, the sensor 105, 205 employs a pulsed time-of-flight rangefinder comprising a diode-laser transmitter and a silicon avalanche photodiode (APD) receiver in a side-by-side, off-axis configuration. For reference, an avalanche photodiode, as used herein, is a photosensor that generates a large amount of current when struck by a small amount of flight due to electron avalanche. The transmitter comprises the diode laser, its driver circuit, and a collimating lens. The optical receiver comprises an objective lens, narrow-band optical filter, detector/amplifier, and threshold detector, each coupled to each other.

The diode-laser, in one embodiment, is an InGaAs injection laser driven by a diode driver to produce a pulsed output. A trigger pulse from a scanner control circuit triggers the laser at the requisite scan angles. In one embodiment, an ideal laser emission wavelength for the silicon APD receiver is 904 nm. FIG. 5B shows a plurality of laser output parameters in accordance with one embodiment of the present invention, including, but not limited to wavelength, maximum pulse width, maximum energy per pulse, and average laser power. In one embodiment, the laser wavelength is 904 nm. In one embodiment, the maximum pulse width is 8 ns. In one embodiment, the maximum energy per pulse is 64 nJ. In one embodiment, the average laser power is 8 µW. The values provided above are exemplary values that reflect one embodiment of the present invention. It should be noted that these values may change and that there may be slight variations from unit to unit due to fluctuations in manufacturing.

Figure 6:
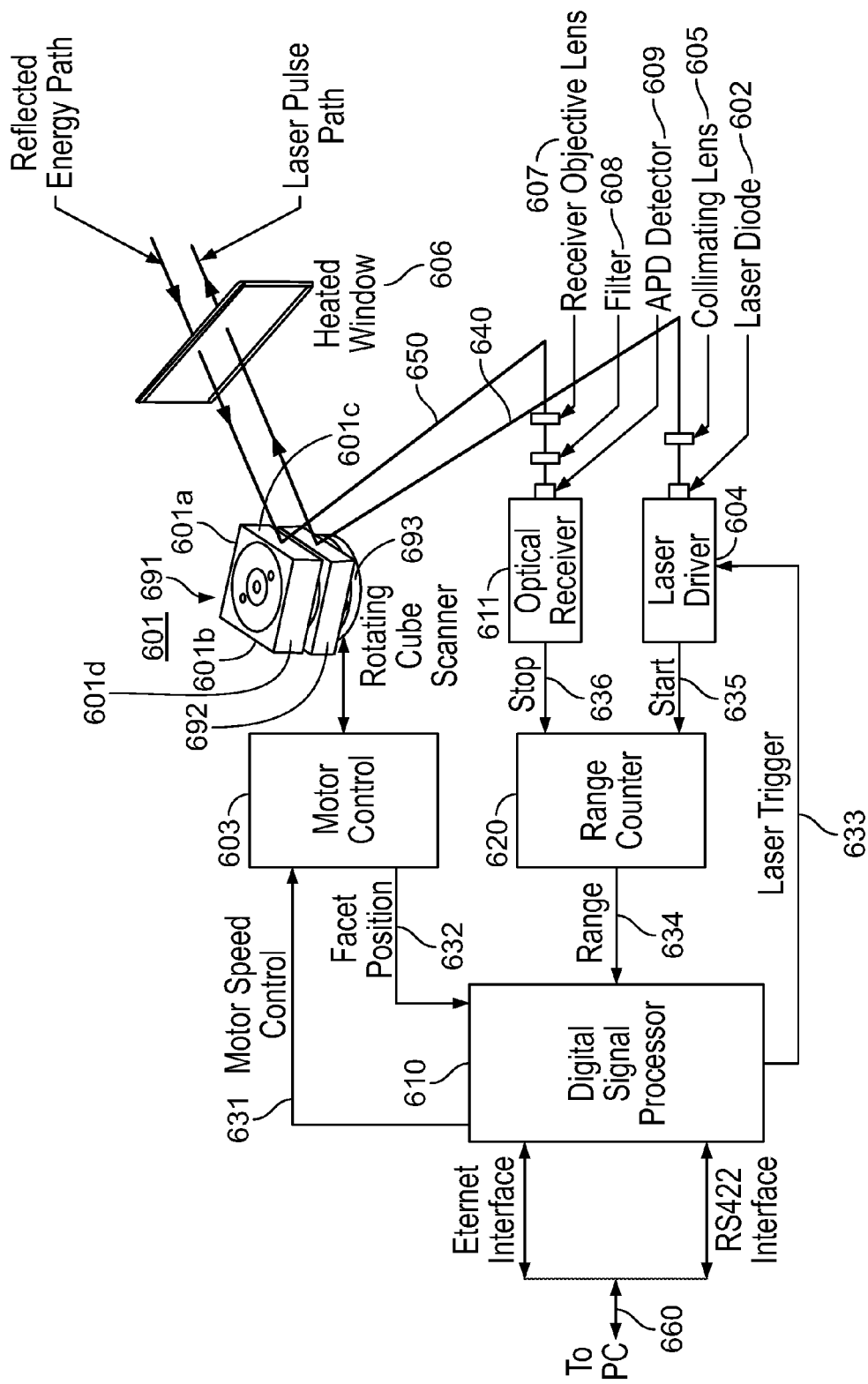

In accordance with one embodiment of the present invention, the sensor also employs a rotating four facet cube to line scan, and thus, effectively directs the diode-laser pulse across its field of view (road) in a straight line. Thus, the four facet cube is employed as a laser collimator. Referring to FIG. 6, cube scanner 601 rotates continuously in one direction at a constant speed. The cube scanner 601 comprises four sides, or facets, 601a, 601b, 601c, and 601d. In one embodiment, the cube scanner 601 comprises one square or rectangular block 691 formed by four facets 601a, 601b, 601c, and 601d and a second square or rectangular block 692 also formed by four facets. The second block 692, which is configured to receive and reflect transmitted energy from the laser diode 602, and the first block 691, which is configured to receive and reflect the reflected energy from the road or vehicles, may be separated by a gap and may be physically coupled through an axis such that the two blocks 691, 692 are capable of rotating relative to each other. The two blocks 691, 692 are mounted on a base 693 that may be separated from the second block 692 by a gap and coupled to both blocks in a manner that permits them to rotate.

Each facet in each block 691, 692 comprises a reflective surface. The angle between each facet and between each facet and the base of the respective block is 90 degrees. The four facet scanning cube enables four scans for each revolution. Conventional scanning systems use a single mirror surface mounted at a 45 degree angle to the axis of the laser, thereby allowing for only one scan per revolution of the mirror. By having four facets that are perpendicular to the laser axis, the cube 601 of the present system provides for four scans per revolution. As such, the motor in the present system need rotate only at $\frac{1}{4}^{th}$ the speed of motors in conventional systems to achieve the same number of scans. In addition, since the laser is pulsed at 1 degree of rotation in the present system, the use of the four sided cube allows the laser in the present system to be pulsed at $\frac{1}{4}^{th}$ of the repetition rate of conventional systems. This allows the present system to spin the motor faster, scan more quickly, and pulse the laser at a lower frequency, which keeps the laser from over working or heating up to a harmful temperature.

The rotating cube enables a fixed angular separation needed to scan the diode-laser 602 in a near straight line across an entire highway, even those having three or more lanes. A motor control mechanism 603 is coupled to the cube 601 to facilitate rotation. Signals for motor speed control 631 and facet position 632 are generated through a digital signal processor (DSP) 610 which, in one embodiment, is connected to a computer through a suitable interface 660.

The DSP 610 also generates the laser trigger signal 633, which triggers the laser driver 604 to activate the laser diode 602. Laser beam emitted from the diode laser is collimated using the lens 605. The beam 640 is directed by the rotating cube scanner 601 and passed through a temperature controlled window 606 to scan the target vehicle. Because the window is capable of being heated and/or cooled, as required, the window is less susceptible to becoming foggy or blurry due to condensation.

In one embodiment, optical detection circuitry converts optical radiation reflected from the vehicle and/or road to an equivalent electrical analog of the input radiation and subsequently, a logic-level signal. Thus, the laser beam reflected from the target vehicle 650 is again directed by the scanning cube 601 through optical detection circuitry comprising a receiver objective lens 607, a filter 608 and an APD detector 609, and finally to optical receiver 611. The logic-level signals are processed within a range counter logic 620 to yield digital range data 634.

In one embodiment, the pulsed time-of-flight measurements are read by the digital signal processor (DSP) 610 and converted into distance/range measurements. In an embodiment, a time-to-digital converter (TDC) is used as an integrated circuit on a single chip for time-of-flight measurements. This device enables the embedded software of the system to determine the range of an object beneath the scanner by providing the time period between a start pulse 635, which is generated when the laser is fired, and a stop pulse 636, which is generated when the reflected energy of the laser hits a target and reflects back to the scanner. The use of TDC provides better resolution, smaller size, simpler circuitry, lower power consumption, and lower cost when compared with prior art time-to-analog conversion (TAC) and analog-to-digital conversion (ADC) multi-chip circuitry. This is because while TDC technology converts time segments into a digital representation of that time, TAC technology converts a time segment into an analog value that must then be converted into a digital value. The TAC requires a relatively large amount of electronic circuitry to perform the task, whereas a TDC consists of a small integrated circuit. TDC consumes approximately 0.005% of circuit board real-estate compared to that needed by the equivalent TAC circuitry. In one embodiment, the range resolution is improved to be ±1 cm, as against ±7.62 cm in prior art.

Further, the TDC can receive up to four return pulses from a single laser pulse. In accordance with an embodiment, by using two TDC chips on the sensor, and switching back and forth between them, eight return pulses from a single laser pulse can be received. In one embodiment, with the maximum range set at 35 ft, eight return pulses are received in no more than 70 nS or 0.00000007 seconds. It may be noted that this may also be achieved using a TAC, but the amount of circuitry required for the purpose would take up at least 200 times more space on a circuit board. This configuration improves the capability of seeing through adverse weather conditions of rain, snow and fog by ignoring the returns that come in from the adverse weather conditions and using the returns from the vehicles traveling under the sensor.

FIG. 5C shows a plurality of environmental factors and associated performance parameters in which the sensor is capable of performing in accordance with one embodiment of the present invention. In one embodiment, the environmental factors include, but are not limited to temperature, thermal shock, humidity, rain, snow loading, ice loading, wind loading, dust, vibration, shock, reliability, and maintainability.

In an embodiment, the provided laser geometry and collimating optics (four facet cube) provide a laser footprint with a characteristic divergence of 82.6 u radians in the vertical axis and 16.5 m radians in the horizontal axis. When the sensor 105 shown in FIG. 1 is mounted at 7.65 m (25 feet) above the roadway, the width of roadway on the ground illuminated by the scanning 90 laser pulses covers 15.3 meter (50 feet). In one embodiment, when the sensor 105 is mounted at approximately 6 m (20 feet) above the roadway, a single laser pulse illuminates a 0.762 mm (0.03") by 139 mm (5.49") strip/footprint on the roadway thereby providing high in-lane resolution and optimum cross-lane coverage for two to three lanes when the laser is pulsed once every degree of the scan angle. In another embodiment, if the sensor is mounted at a height of 7 meters, for example, each range measurement for the laser beam illuminates a 0.508 mm (0.02") by 115.6 mm (4.55") strip/footprint on the pavement.

Figure 3:
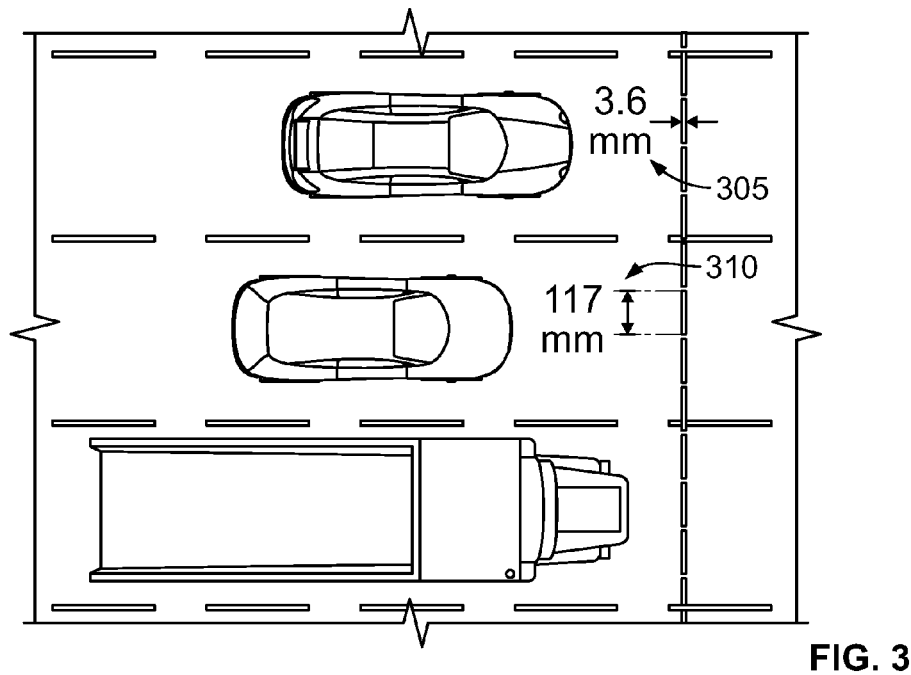
FIG. 3 shows the laser footprint, in one embodiment, wherein the sensor is mounted at a height of approximately 7 meters.

Referring to FIG. 3, in another embodiment when the sensor is mounted at a height of 25 feet, the laser footprint falling on the pavement is approximately 0.15 in (3.6 mm) in a vertical direction 310 and 4.6 in (117 mm) in a horizontal direction 305. It should be appreciated that the footprints appear as stripes along the pavement. These "striped" pattern footprints are formed during scanning and appear as successive stripes across the road that just touch end to end therefore providing a continuous line of detection. The striped footprint pattern is a result of the use of a diode laser where the output facet of the light emitting chip is rectangular in shape.

In one embodiment, the system generates 90 pixels for each scan, which line up across the scan line with very little gap in between. With the mounting geometry of FIG. 1, the pixel-to-gap-ratio is more than 18.8. The gap between subsequent pixels is approximately 6.6 mm (0.26") at this mounting height. Hence, any shape larger than the size of the gap, e.g. a 5 cm (2") tow bar, will be detected by at least one pixel of the sensor, thereby enabling vehicle detection accuracy exceeding 99% in one embodiment. This type of laser footprint that appears as a continuous scan line allows, for example, for detection of a trailer and also its attachment to the towing vehicle. It may be noted that the high pixel-to-gap ratio is achieved by use of the striped, continuous scan line design of the present system. In one embodiment, the laser is pulsed at 1 degree intervals. With the interval known, the appropriate laser width and optics are selected to yield a specific beam divergence, such that the width of the laser increases in size at the exact rate as the angle separation. One of ordinary skill in the art would appreciate that conventional laser scanners have a round footprint, as opposed to a striped, continuous scan line of the present invention, and hence conventional scanners produce a great amount of overlap as the range increases, whereas the presently disclosed embodiments minimize overlap.

FIG. 5A is a table showing a plurality of performance parameters for the sensor of the present invention in accordance with one embodiment, such as scan rate, range accuracy, angular resolution, etc. In accordance with one aspect of the disclosed inventions, the minimum range gate of the sensor can be set and/or customized by a customer. This enables the customer to set the sensor to ignore any returns up to a predetermined range and only process distances beyond that range. In one embodiment, the minimum range gate can be set from 0 ft up to 25 ft in ⅛ ft increments. This also can be used to prohibit adverse weather conditions from causing short ranges (false alarms) that could distort the resultant three-dimensional profile of the vehicle being scanned.

In one embodiment, the customer can customize the number of pulses that will occur within each scan. In one embodiment, the customer can customize the angle of the scan. In one embodiment, the angle of the scan can be adjusted from a maximum of 90 degrees to a minimum of 20 degrees. A person of ordinary skill in the art would appreciate that several other parameters may be adjusted by software according to user preference.

Persons of ordinary skill in the art should appreciate that since sensor of the present invention measures ranges in a single plane, the speed of the moving vehicle is optionally captured by other sensor(s) in order to allow a calibrated three-dimensional measurement. However, even a non-calibrated 3-D profile allows valuable information about the vehicle profile and enables the computer to easily distinguish between, for example, a truck and a bus. One of ordinary skill in the art would appreciate that the various types of vehicle classifications, such as truck, bus, pickup, car, van, sedan, convertible, compact, etc. is only limited by the complexity of software, and hence the system can be adapted to classify vehicles into any number of categories. In one embodiment, the system is able to classify up to 12 classes of vehicles. In one embodiment, the sensor of the present invention automatically initializes the ranging process upon power-up, and its self-calibration process eliminates the need for any field adjustments on initialization.

In accordance with another aspect, the system of the present invention has the capability of reporting the intensity of reflected objects along with the range data. The purpose of capturing the reflected intensity for every pixel across the scan line is to perform range correction and to provide additional data to the classification algorithm in determining the class of vehicle. In addition, the intensity data can be used to improve the classification and detection of vehicles during adverse weather conditions. In the event of reflection from pooling water or oil on the ground or reflection from a vehicle wind screen, the range reported by the sensor can be significantly longer than the actual range to the reference surface. Therefore the capture of intensity data helps the user understand why the data reported from the sensor appears to be wrong. Another example of troubleshooting is the case where the optical alignment of the sensor has been altered for unknown reasons. In this case, the intensity reflected back to the scanner may be too low for proper and consistent ranging. Accordingly, analyzing the range and intensity data enables system operators to identify the cause of reduced sensor performance.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A system for determining the three-dimensional shape of a vehicle, the system comprising:
    a distance sensor comprising a laser transmitter and a photodetector, for generating a plurality of laser beams and for detecting a plurality of reflected beams, each of said reflected beams corresponding to one of the plurality of generated laser beams;
    a scanning mechanism, positioned relative to the distance sensor, for collimating each of said generated laser beams across the vehicle, wherein said scanning mechanism comprises a four facet cube, each having a reflective surface, wherein said four facet cube is positioned relative to the distance sensor such that it is adapted to reflect the generated laser beams, and wherein said scanning mechanism further comprises a scanner control circuit in data communication with said distance sensor to trigger the generation of the laser beams to create predefined scan angles; and
    a processing system to determine distance ranges from the sensor to portions of the vehicle using time-of-flight measurements derived from timings of said generated laser beams and reflected beams, when the vehicle travels within a sensing zone of the sensor and to determine a three-dimensional shape of the vehicle based on distance ranges.

2. The system of claim 1 further comprising a time-to-digital converter (TDC) for time-of-flight measurements.

3. The system of claim 2 wherein the TDC is adapted to receive up to four return pulses from a single laser pulse.

4. The system of claim 2 comprising at least two TDCs.

5. The system of claim 1, wherein the four facet cube rotates continuously in one direction at a constant speed.

6. The system of claim 1, wherein the four facet cube enables four scans for each revolution.

7. The system of claim 1, wherein the system generates a plurality of laser footprints and wherein said laser footprints appear as stripes that touch end to end and provide a continuous line of detection.

8. The system of claim 1, wherein the distance range resolution of the system is ±1 cm.

9. The system of claim 1, wherein the limits of distance range measurements are customizable.

10. A method for determining a three-dimensional shape of a vehicle passing through a sensing zone of a ranging sensor comprising a laser transmitter and a photodetector, the method comprising:
    scanning a plurality of laser beams across the vehicle using a scanning mechanism comprising a four facet cube, said four facet cube having reflective surfaces that are used to direct the laser beams across its field of view in a straight line, said scanning mechanism further comprising a scanner control circuit that triggers the laser at predefined scan angles;
    determining a distance range from the sensor to portions of the vehicle using time-of-flight measurements; and
    processing the distance range data for each scan angle to determine the three-dimensional shape of the vehicle.

11. The method of claim 10, wherein the four facet cube rotates continuously in one direction at a constant speed during scan.

12. The method of claim 10, wherein the scanning cube is adapted to produce four scans for each revolution.

13. The method of claim 10 further comprising using a time-to-digital converter (TDC) for time-of-flight measurements.

14. The method of claim 13 wherein the TDC is adapted to receive up to four return pulses from a single laser pulse.

15. The method of claim 13, wherein the system comprises at least two TDCs.

16. The method of claim 10, wherein the system generates a plurality of laser footprints during a scan and wherein each of said laser footprints appear as stripes that touch end to end and provide a continuous line of detection.

17. The method of claim 10, wherein the distance range resolution of measurements is ±1 cm.

18. The method of claim 10, wherein the limits of distance range measurements are customizable.

19. The method of claim 10, wherein when the scanner control circuit triggers a laser pulse once for every degree of scan angle.

* * * * *